United States Patent [19]
Hüsges

[11] 3,989,235
[45] Nov. 2, 1976

[54] METHOD OF AND MEANS FOR SANDWICHING A CENTRAL LAYER AND TWO OUTER LAYERS PREPARATORILY TO LAMINATION

[75] Inventor: Walter Hüsges, Niederkruchten, Germany

[73] Assignee: G. Siempelkamp & Co., Krefeld, Germany

[22] Filed: Mar. 10, 1975

[21] Appl. No.: 556,967

[30] Foreign Application Priority Data
Mar. 9, 1974 Germany............................ 2411300

[52] U.S. Cl. ............................... 270/58; 214/6 FS; 214/6 M
[51] Int. Cl.² ........................................ B65H 39/055
[58] Field of Search ..................... 270/58; 271/9, 12; 214/6 FS, 6 M, 6 S, 8.5 A, 8.5 B, 8.5 C, 8.5 R, 8.5 F; 211/46–47

[56] References Cited
UNITED STATES PATENTS

| | | | |
|---|---|---|---|
| 2,579,094 | 12/1951 | Rooksby | 271/9 |
| 3,279,664 | 10/1966 | Lynch | 214/8.5 R |
| 3,334,891 | 8/1967 | Clausen | 271/12 |

Primary Examiner—Edgar S. Burr
Assistant Examiner—A. Heinz
Attorney, Agent, or Firm—Karl F. Ross; Herbert Dubno

[57] ABSTRACT

In assembling a three-layer sandwich for the manufacture of a laminated board, a first sheet designed to form the bottom layer is picked up by a horizontally movable gripper from a repository at one side of a stacking table and is pulled by the gripper across that table while a pronged carrier picks up a second sheet, designed to form the middle layer, from a roller track at the opposite side of the stacking table. As the gripper reaches the end of its transfer stroke, it magnetically links up with the pronged carrier to entrain same across the stacking table during the return stroke of the gripper so as to align the second sheet with the first one. Next, the gripper seizes a third sheet, designed to form the upper layer, at the repository and pulls it over the stacking table where the second sheet is being retained by stripping lugs as the carrier returns to its loading position. Finally, the carrier lowers its prongs preparatorily to picking up a further sheet from the roller track while the gripper, now decoupled from it, moves back toward the repository for the start of a new cycle as the three stacked sheets are engaged by edge-clamping jaws and removed from the table to a laminating press.

8 Claims, 4 Drawing Figures

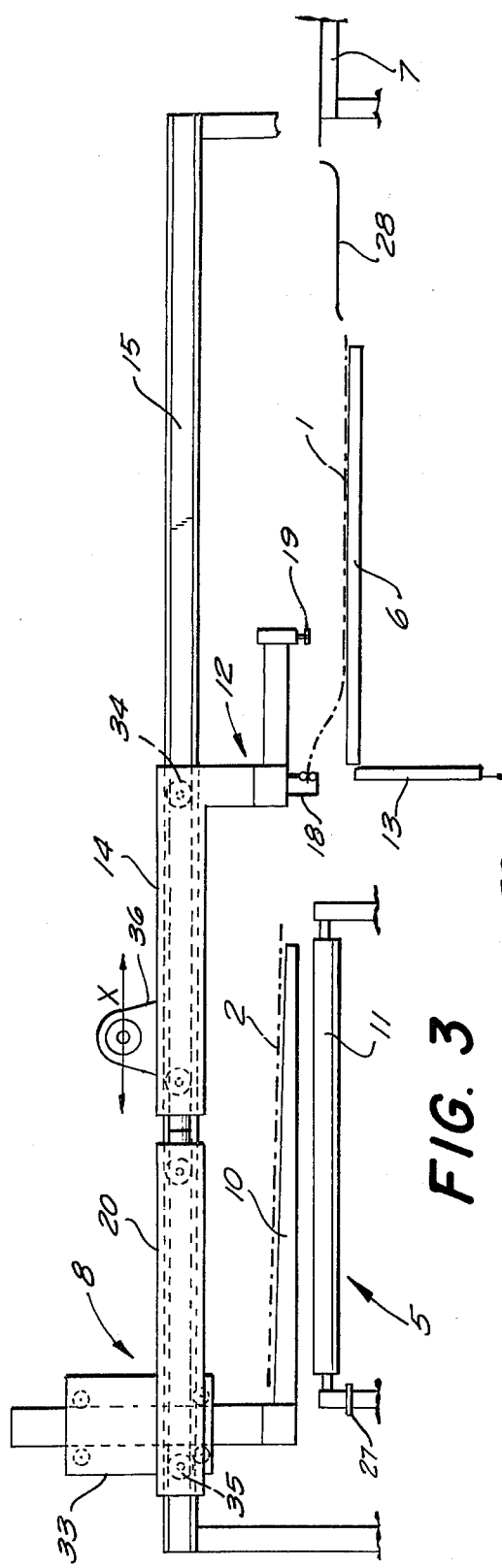
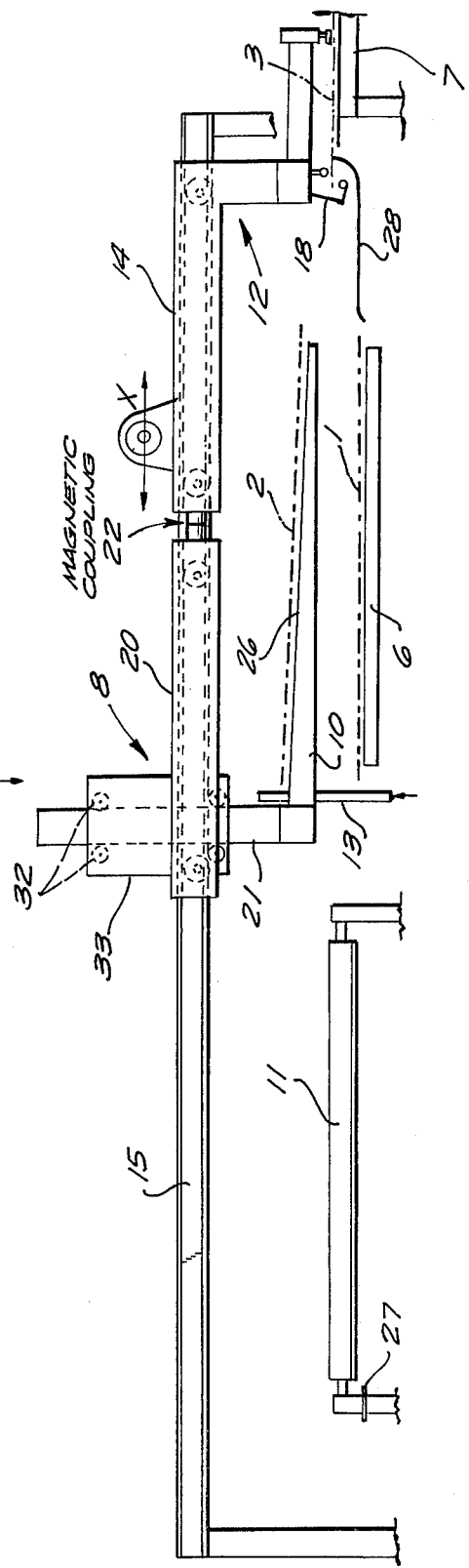
FIG. 3
FIG. 4

METHOD OF AND MEANS FOR SANDWICHING A CENTRAL LAYER AND TWO OUTER LAYERS PREPARATORILY TO LAMINATION

FIELD OF THE INVENTION

My present invention relates to a method of and means for stacking alternating sheets of a first and a second kind, more particularly for producing a laminate wherein a middle layer of, for example, the pressed-board type is sandwiched between mutually identical top and bottom layers of, say, a wear-resistant plastic material.

BACKGROUND OF THE INVENTION

In commonly owned application Ser. No. 533,219, filed by me jointly with Manfred Posselt on 16 Dec. 1974, there has been disclosed a mechanism for transporting a three-layer stack to a platen press, the mechanism including a carriage with two sets of clamps whose jaws engage opposite stack edges after the clamps have been swung toward these edges about pivotal axes parallel thereto. In an earlier commonly owned application, Ser. No. 348,013 filed 5 Apr. 1973 by Manfred Posselt, now U.S. Pat. No. 3,909,343 a laminating press is described whose platens are laterally recessed to accommodate such jaws whereby the stack can remain clamped during the laminating operation.

OBJECTS OF THE INVENTION

The general object of my present invention is to provide a method of and an apparatus for rapidly assembling such a stack, especially one of three layers as discussed above, from two kinds of preferably rectangular, coextensive sheets.

A more particular object is to provide simple and efficient means for assembling such a stack in a position in which it can readily be carried off to another destination, such as a laminating press, by a clamp mechanism of the type disclosed in the commonly owned application first referred to.

SUMMARY OF THE INVENTION

In accordance with my invention, a stacking table is flanked by a first and second repository on which sheets of a first kind (e.g. of resin-impregnated paper), referred to hereinafter as cover sheets, and sheets of a second kind (e.g. precompressed boards of cellulose fibers and thermosetting resin), referred to hereinafter as core sheets, are respectively placed by hand or automatically. A first and a second sheet transporter are jointly reciprocable across the stacking table for alternately engaging cover sheets and core sheets preparatorily to transferring them to the table; engagement of a cover sheet by the first sheet transporter occurs substantially concurrently with the deposition of a core sheet on the table, and vice versa.

In principle, this mode of operation may be repeated as often as is necessary to build a stack with any number of interleaved cover sheets and core sheets. With core sheets of limited coherency, however, such as prepressed but not yet thermally bonded layers of fiberboard material, the second sheet transporter must be designed to handle these layers with the necessary care and cannot, therefore, subject them to tensile stress. Thus, whereas a plastic foil or a resin-impregnated paper sheet can be seized by a gripper engaging one of its edges, an uncured fiberboard layer must be transported by a carrier engaging it from below at closely spaced locations. I therefore prefer, especially in a laminating system as primarily here envisaged, to design the second repository as a plurality of spaced-apart supports such as rollers between which a set of sheet-engaging prongs of that carrier are receivable, generally by lowering the prongs in the absence of a core sheet and, after such a sheet has been properly positioned on the rollers, elevating the prongs to clear the rollers during transfer of the sheet to the stacking table. Since the raising and lowering of a pronged carrier to engage a core sheet takes more time than the seizure of an edge of a cover sheet by a gripper, an important feature of my invention provides for the use of two normally disconnected sheet transporters — i.e. a gripper and a carrier — which are releasably coupled together during deposition of one cover sheet on the stacking table by the gripper and are decoupled during deposition of the next cover sheet so that the gripper returns alone to the first repository while the carrier picks up another core sheet and the three-layer stack just assembled is removed from the table. The cycle is then repeated, with recoupling of the carrier to the gripper upon the following transfer stroke of the latter.

BRIEF DESCRIPTION OF THE DRAWING

The above and other features of my invention will now be described in detail with reference to the accompanying drawing in which:

FIG. 3 is a partial view of the apparatus, similar to FIG. 1, in another operating position; and FIG. 4 is a view similar to FIG. 3, showing a further position.

SPECIFIC DESCRIPTION

Figure 1:
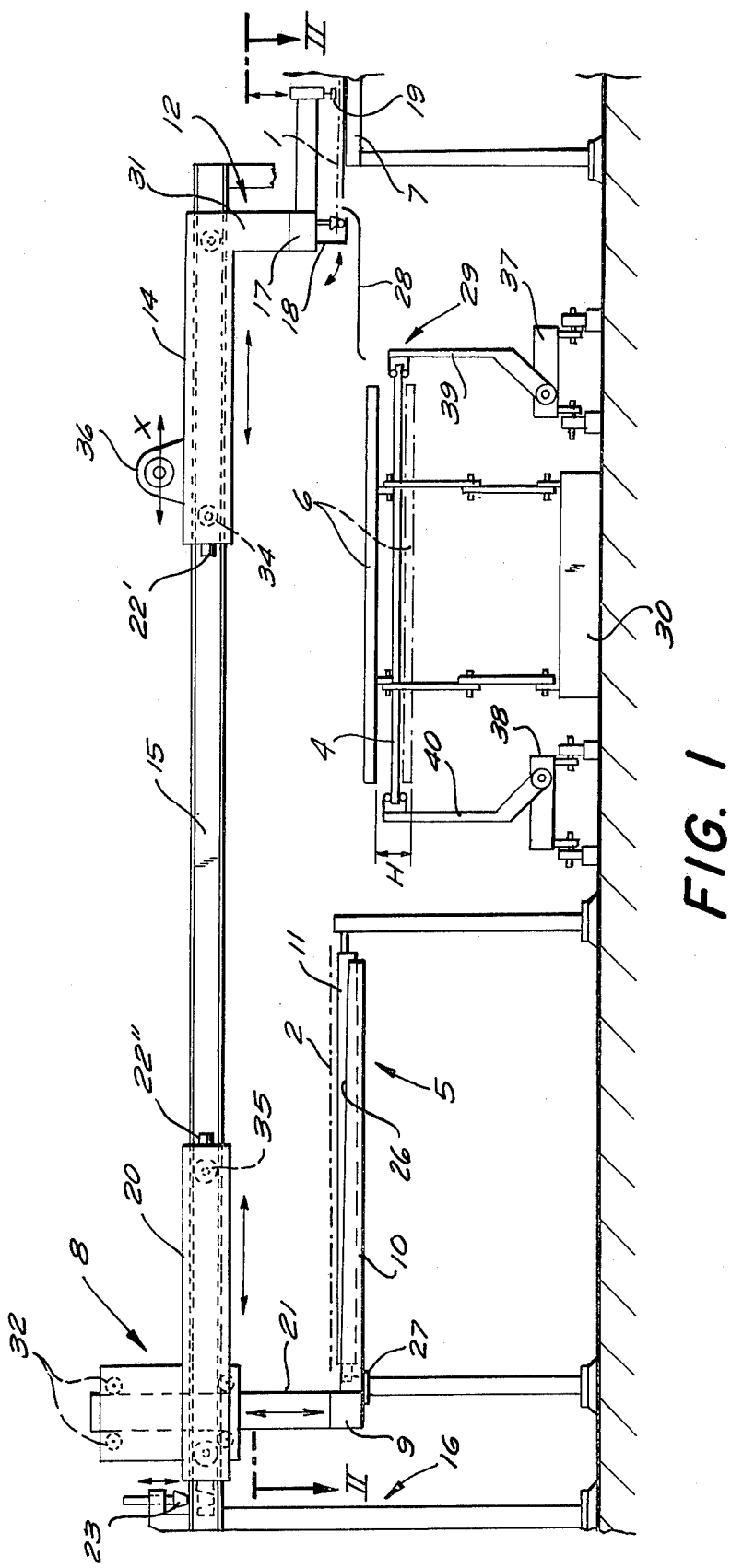
FIG. 1 is a schematic side-elevational view of a stacking apparatus embodying the invention.
Figure 2:
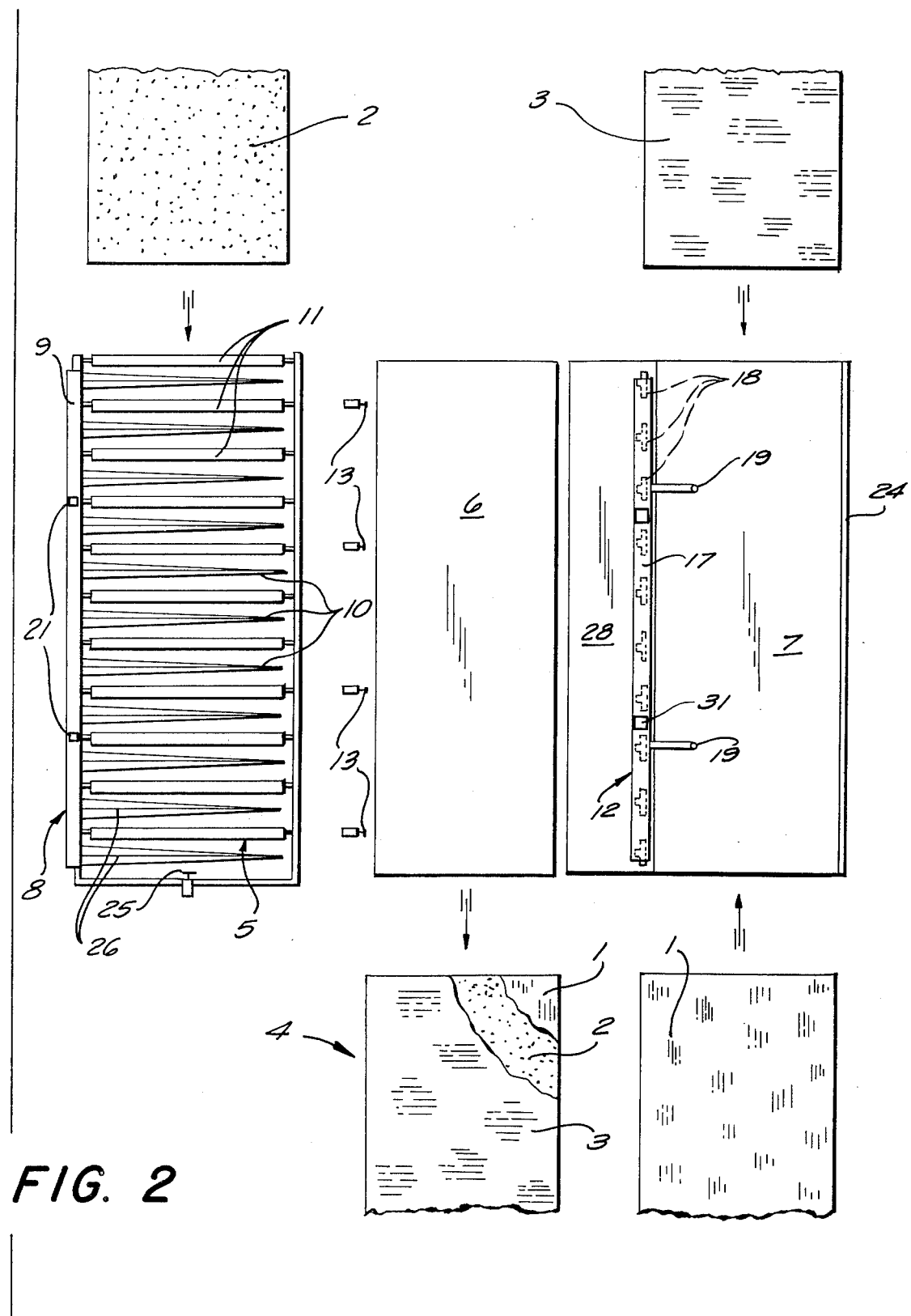
FIG. 2 is a schematic top view of the apparatus shown in FIG. 1, taken on the line II — II thereof.

The apparatus shown in the drawing is designed to assemble a three-layer stack 4 from a lower cover sheet 1, a core sheet 2 and an upper cover sheet 3. Sheets 1 and 3, consisting for example of resin-impregnated paper, are alternately placed on a horizontal supporting surface of a table 7 so as to overhang that surface by their left-hand edges. Core sheets 2 are conveyed over a roller track 5 to an end stop 25 determining a position of alignment with a stacking table 6 which is flanked by the two repositories 5 and 7. A guide plate 28 bridges the space between tables 6 and 7; stacking table 6 is vertically displaceable over a height H via a nonillustrated mechanism in its base 30. The rollers of track 5 may be smooth or pin-studded.

A first transporter 12, serving to transfer cover sheets 1, 3 to the stacking table 6, comprises a carriage 14 with legs 31 interconnected by a transverse beam 17 which supports a multiplicity of claws 18 and a pair of pressure heads 19. A second transporter 8, serving to transfer the core sheets 2, comprises a carriage 20 with a pair of vertical racks 21 carrying a transverse beam 9, the racks being engaged via pinions 32 by a nonillustrated servomotor in a housing 33. The two carriages 14 and 20 are supported by rollers 34, 35 on a plurality of parallel I-beams 15 forming a guide track which extends parallel to rollers 5 across the stacking table 6.

Carriage 14 has a lug 36 connected to a nonillustrated drive member, such as a pitman, by which it is continuously reciprocated over a major part of the guide track 15, as symbolized by a double-headed arrow X, between two limiting positions shown in FIGS. 1 and 3. Carriages 14 and 20 can be releasably interlinked by a magnetic coupling 22 comprising cores 22' and 22'', at least the cores 22' being intermittently magnetizable by a conventional energizing circuit under the control of a programmer (not shown) in correlation with the reciprocation of carriage 14. Upon being decoupled from the positively driven carriage 14, carriage 20 is indexable in a retracted or loading position (FIG. 1) by a detent 23 which may also be magnetically operated.

The beam 9 of carriage 20 carries a multiplicity of substantially horizontal prongs 10, with downwardly sloping upper edges 26, which point toward the table 6 and fit between the track rollers 5. In their lowered position illustrated in FIG. 1, these prongs come to rest on a ledge 27 and lie with their edges 26 just below the repository surface defined by the rollers 5; upon being elevated by the lifting means 21, 32, the prongs lie well above these rollers substantially at the level of the beam 17 of carriage 14 as seen in FIGS. 3 and 4. The sloping of edges 26 facilitates the dislodgment of a sheet from prongs 10 by elavatable stripping lugs 13 next to table 6.

A stack-removing mechanism 29 comprises a pair of carriages 37, 38, interconnected in a manner not further illustrated, on which two sets of clamps 39, 40 are pivotable about respective axes transverse to guide track 15. The clamps 39, 40 have jaws engageable with overhanging sheet edges on opposite sides of table 6, upon a lowering of that table as indicated in phantom lines in FIG. 1, for moving the stack 4 from table 6 to a nonillustrated laminating press as described in the above-identified commonly owned application Ser. No. 533,219. The operation of mechanism 29 is also correlated with that of the carriage drive by the aforementioned programmer.

At the beginning of an assembling cycle, upon the return of table 6 to its normal elevated position (full lines) after the removal of a stack 4 therefrom, gripper 12 and carrier 8 are disconnected from each other and are in their respective loading positions shown in FIG. 1. At this time a sheet 1 rests on the surface of table 7 and is being held down by the pressure heads 19 which are lowered, e.g. electromagnetically, under the control of the programmer. Claws 18 then seize the overhanging sheet edge whereupon the pressure heads are released and carriage 14 starts its leftward movement to pull the sheet 1 over the stacking table 6 by way of guide plate 28. During this first transfer stroke, carriage 20 is indexed in its loading position while the prongs 10 are being elevated to pick up a sheet 2 which has meanwhile been slid over rollers 5 to its end stop 25. As the carriage 14 reaches its other terminal position (i.e. its unloading position) shown in FIG. 3, the magnetic coupling 22 is made effective and the detent 23 is retracted while the claws 18 release the engaged sheet edge so that sheet 1 may come to rest on table 6, with its lateral edges overhanging that table. Next, the interlinked carriages are displaced along track 15 into the position of FIG. 4 in which the prongs 10 overlie the stacking table while the claws 18 are poised to seize the overhanging edge of a sheet 3 meanwhile deposited on table 7. Upon the gripping of sheet 3, the train 14, 20 reverses its motion after lugs 13 have been elevated under the control of the programmer into the path of sheet 2 which is thus stripped off the prongs 10 and drops onto the sheet 1 already deposited on table 6. When this stroke is terminated, the carriages are again in the position of FIG. 3 but now a sheet 3 is deposited on the table 6, on top of the sheets 1 and 2 already there, to complete the building of another stack 4. The electromagnetic coupling 22 is then released and detent 23 is reactivated so that carriage 14 returns alone to its loading position shown in FIG. 1; during this return stroke, clamping mechanism 29 operates to remove the stack 4 just formed, prongs are lowered preparatorily to the arrival of a new sheet 2 on roller track 5, and another sheet 1 is placed on table 7 for seizure by the oncoming claws 18. The cycle is then repeated.

I claim:

1. An apparatus for forming a succession of stacks each consisting of two sheets of a first kind and one sheet of a second kind sandwiched therebetween, comprising:
    a stacking table;
    a first and a second repository for sheets of the first and the second kind, respectively, on opposite sides of said table;
    first and second sheet transporters each independently reciprocable between a loading position adjacent said first and said second repository, respectively, and an unloading position, said first and second sheet transporters being provided with first and second pickup means for engaging a sheet of said first and said second kind, respectively, and depositing the engaged sheet on said table;
    drive means for reciprocating said first sheet transporter; and
    intermittently operative link means programmed to interconnect said sheet transporters for entrainment of said second sheet transporter by said first sheet transporter, upon deposition of one sheet of said first kind on said table, and to disconnect said sheet transporters from each other after a single joint reciprocation by said drive means whereby a sheet of said second kind and another sheet of said first kind are successively deposited on said table to form a stack with said one sheet of said first kind.

2. A apparatus as defined in claim 1, further comprising releasable detent means for holding said second sheet transporter in its loading position during a reciprocation of said first sheet transporter upon disconnection of said sheet transporters by said link means.

3. An apparatus as defined in claim 1 wherein said link means comprises an electromagnetic coupling.

4. An apparatus as defined in claim 1 wherein said first and second sheet transporters are provided with a common track extending across said table.

5. An apparatus as defined in claim 4 wherein said table has a width less than that of said sheets for letting lateral edges of sheets deposited thereon project from said table, further comprising movable clamping means on opposite sides of said table engageable with the projecting edges of a stack of sheets for removing said stack from said table.

6. An apparatus as defined in claim 4 wherein said first repository has a substantially horizontal surface overhung by an edge of a sheet resting thereon, said first pickup means being a gripper engageable with the overhanging sheet edge, said second repository comprising a plurality of spaced-apart supports, said second pickup means being receivable between said supports for picking up a sheet of said second kind.

7. An apparatus as defined in claim 6 wherein said supports are rollers parallel to said track, said second pickup means comprising a set of prongs provided with lift means for lowering said prongs into the space between said rollers in the absence of a sheet of said second kind on said rollers and for subsequently elevating said prongs, loaded with such a sheet, above said spaces prior to entrainment of said second sheet transporter by said gripper toward said table, said prongs pointing toward said table, further comprising stripper means alongside said table elevatable between said prongs for dislodging a sheet therefrom during return of said second sheet transporter to a loading position above said rollers.

8. An apparatus as defined in claim 6 wherein said gripper is provided with claw means for seizing the overhanging sheet edge and with pressure means for holding down a sheet on said surface just before seizure of an edge thereof by said claw means.

* * * * *